US012410720B2

(12) United States Patent
Darby et al.

(10) Patent No.: US 12,410,720 B2
(45) Date of Patent: Sep. 9, 2025

(54) TURBINE ENGINE HAVING A ROTATABLE DISK AND A BLADE

(71) Applicant: GENERAL ELECTRIC COMPANY, Schenectady, NY (US)

(72) Inventors: Lane Stewart Darby, Woodlawn, OH (US); Joseph Charles Albers, Walton, KY (US); Gregory Michael Petrasko, Hamilton, OH (US)

(73) Assignee: General Electric Company, Evendale, OH (US)

( * ) Notice: Subject to any disclaimer, the term of this patent is extended or adjusted under 35 U.S.C. 154(b) by 49 days.

(21) Appl. No.: 18/500,660

(22) Filed: Nov. 2, 2023

(65) Prior Publication Data

US 2025/0146419 A1 May 8, 2025

(51) Int. Cl.
*F01D 5/30* (2006.01)
*F01D 5/32* (2006.01)
*F01D 11/00* (2006.01)

(52) U.S. Cl.
CPC ......... *F01D 5/3007* (2013.01); *F01D 5/3092* (2013.01); *F01D 5/323* (2013.01); *F01D 11/006* (2013.01); *F05D 2220/32* (2013.01); *F05D 2240/30* (2013.01); *F05D 2240/55* (2013.01)

(58) Field of Classification Search
CPC ...... F01D 5/323; F01D 5/3092; F01D 11/006; F01D 5/081
See application file for complete search history.

(56) References Cited

U.S. PATENT DOCUMENTS

| | | | | |
|---|---|---|---|---|
| 2,928,651 A * | 3/1960 | Turnbull | F01D 5/323 416/221 |
| 3,479,009 A * | 11/1969 | Bean | F01D 5/323 416/216 |
| 3,814,539 A | 6/1974 | Klompas | |
| 4,051,585 A | 10/1977 | Walker et al. | |
| 4,084,922 A | 4/1978 | Glenn | |
| 4,094,615 A | 6/1978 | Glenn | |
| 4,102,602 A | 7/1978 | Rottenkolber | |
| 4,111,603 A | 9/1978 | Stahl | |
| 4,142,836 A | 3/1979 | Glenn | |
| 4,207,029 A | 6/1980 | Ivanko | |
| 4,478,554 A * | 10/1984 | Surdi | F01D 5/323 416/221 |
| 5,222,865 A | 6/1993 | Corsmeier | |
| 5,277,548 A | 1/1994 | Klein et al. | |
| 5,372,481 A | 12/1994 | Boyd | |
| 5,405,245 A | 4/1995 | Cornelius | |
| 5,431,541 A | 7/1995 | Shaffer | |

(Continued)

FOREIGN PATENT DOCUMENTS

| | | | | |
|---|---|---|---|---|
| FR | 3075255 A1 * | 6/2019 | F01D 11/006 |
| GB | 914548 A | 1/1963 | |

(Continued)

*Primary Examiner* — Topaz L. Elliott
(74) *Attorney, Agent, or Firm* — Hanley, Flight & Zimmerman, LLC

(57) ABSTRACT

A turbine engine has a rotatable disk, a seal cartridge, and a blade. The rotatable disk has a peripheral surface, with at least one slot located in the peripheral surface. The seal cartridge defines a blade seat. The blade has a root, a leading edge and a trailing edge, the root being received within the blade seat.

20 Claims, 6 Drawing Sheets

(56) References Cited

U.S. PATENT DOCUMENTS

| | | | | |
|---|---|---|---|---|
| 5,435,693 | A | 7/1995 | Shaffer | |
| 5,580,219 | A | 12/1996 | Frey et al. | |
| 5,743,713 | A | 4/1998 | Hattori et al. | |
| 6,059,529 | A * | 5/2000 | Schiavo | F01D 5/187 416/95 |
| 7,163,375 | B2 | 1/2007 | Queriault et al. | |
| 7,866,950 | B1 | 1/2011 | Wilson, Jr. | |
| 8,011,892 | B2 | 9/2011 | Ramlogan et al. | |
| 8,162,616 | B2 | 4/2012 | Belmonte et al. | |
| 8,668,448 | B2 | 3/2014 | Farah et al. | |
| 8,696,320 | B2 | 4/2014 | Harris, Jr. et al. | |
| 8,840,374 | B2 * | 9/2014 | Garcia-Crespo | F01D 5/3007 416/219 R |
| 8,845,288 | B2 * | 9/2014 | Tholath | F01D 5/081 416/95 |
| 9,453,422 | B2 | 9/2016 | Hile et al. | |
| 10,094,228 | B2 * | 10/2018 | Jendrix | F01D 5/3007 |
| 2009/0257875 | A1 | 10/2009 | McCaffrey et al. | |
| 2010/0189556 | A1 | 7/2010 | Propheter-Hinckley et al. | |
| 2010/0226777 | A1 * | 9/2010 | Forgue | F04D 29/322 416/221 |
| 2011/0038734 | A1 | 2/2011 | Marra | |
| 2012/0003103 | A1 * | 1/2012 | Tholath | F01D 5/082 416/96 A |
| 2013/0078101 | A1 * | 3/2013 | Garin | F01D 5/081 416/204 R |
| 2013/0094968 | A1 * | 4/2013 | Garcia-Crespo | F01D 5/147 416/219 R |
| 2013/0171001 | A1 | 7/2013 | Garcia-Crespo | |
| 2014/0234117 | A1 * | 8/2014 | Cairo | C04B 35/565 29/889.7 |
| 2014/0286756 | A1 * | 9/2014 | Hile | F01D 5/3015 29/889.21 |
| 2016/0090841 | A1 * | 3/2016 | Himes | F01D 5/3007 29/889.21 |
| 2016/0097289 | A1 * | 4/2016 | Benson | F01D 5/3007 416/220 R |
| 2016/0319681 | A1 * | 11/2016 | Jendrix | F01D 11/02 |
| 2024/0360769 | A1 * | 10/2024 | Delaporte | F01D 5/3092 |

FOREIGN PATENT DOCUMENTS

| | | | | | |
|---|---|---|---|---|---|
| GB | 2408296 | A * | 5/2005 | F01D 11/006 |
| WO | WO-2021008815 | A1 * | 1/2021 | F01D 5/3007 |

* cited by examiner

TURBINE ENGINE HAVING A ROTATABLE DISK AND A BLADE

GOVERNMENT SPONSORED RESEARCH

This invention was made with United States Government support. The United States Government may have certain rights in the invention.

TECHNICAL FIELD

The disclosure generally relates to a turbine engine, and specifically to a turbine engine having rotatable disk and a blade receivable by the rotatable disk.

BACKGROUND OF THE INVENTION

Turbine engines, and particularly gas or combustion turbine engines, are rotary engines that extract energy from a flow of gases passing through a fan section, a compression section, a combustion section and a turbine section. The fan section includes a plurality of fan blades. The compression section includes a series of compressor stages, which include pairs of rotating blades and stationary vanes. The turbine section includes a series of turbine stages, which include pairs of rotating blades and stationary vanes. The blades are mounted to rotating disks, while the vanes are mounted to stationary portions of the turbine engine.

During operation, air is brought into the compressor section through the fan section. The air is then pressurized in the compressor and mixed with fuel in the combustor for generating hot combustion gases. The hot combustion gases flow downstream through the turbine stages. In the turbine stages, the air is expanded and ultimately exhausted out an exhaust section. The expansion of the air in the turbine section is used to drive the rotation sections of the fan section and the compressor section. The drawing in of air, the pressurization of the air, and the expansion of the air is done, in part, through rotation of various rotating blades mounted to respective disks throughout the fan section, the compressor section, and the turbine section. The rotation of the blades imparts mechanical stresses along various portions of the blade; specifically, where the blade is mounted to the rotatable disk.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DESCRIPTION OF EMBODIMENTS OF THE INVENTION

Figure 1:
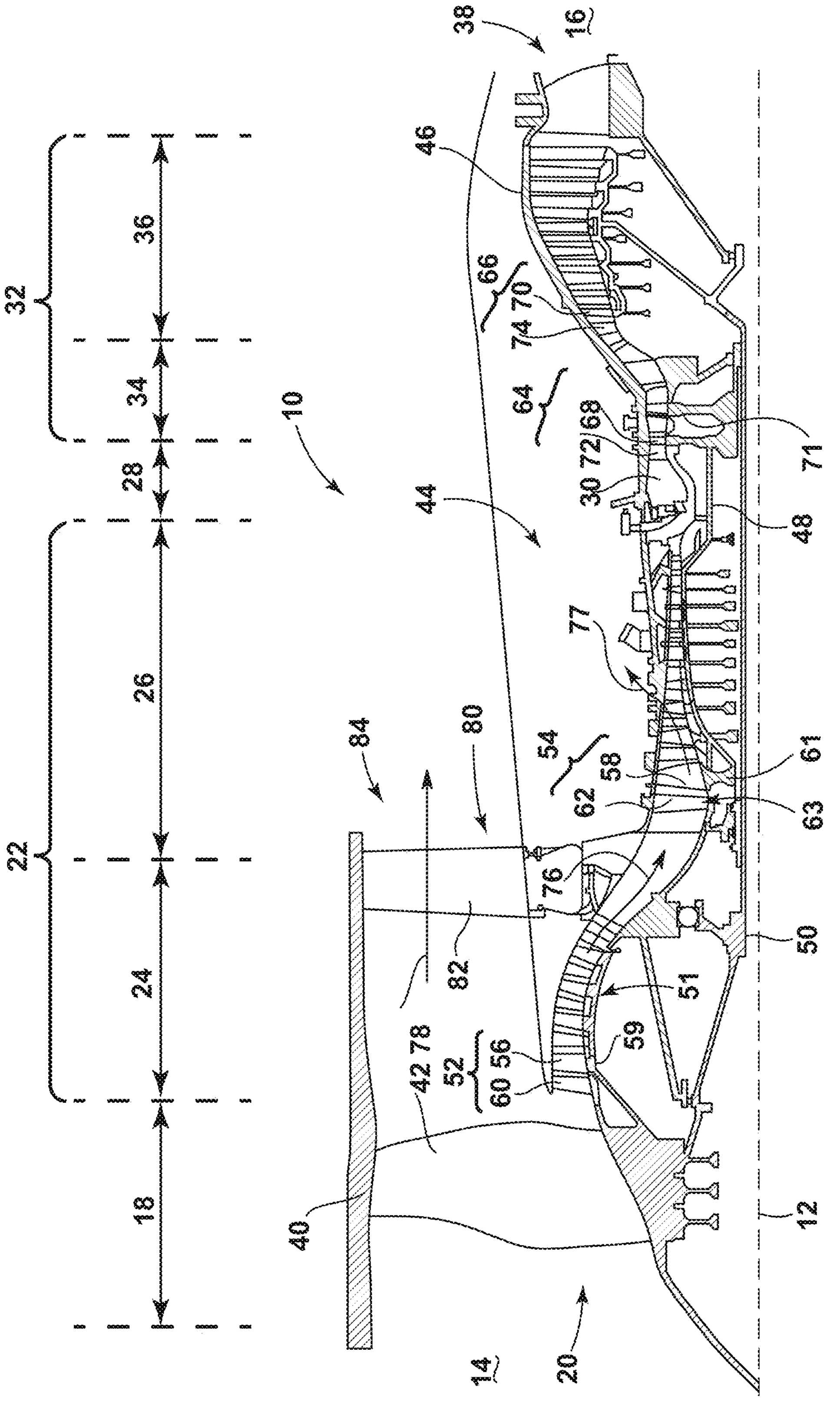
FIG. 1 is a schematic cross-sectional view of a turbine engine in accordance with an exemplary embodiment of the present disclosure.

Aspects of the disclosure herein are directed to a turbine engine including a rotatable disk, a blade, and a seal cartridge. The rotatable disk is rotatable about a rotational axis and includes a slot. The blade and the seal cartridge are receivable within the slot. The seal cartridge includes a plate and at least one arm that together form a blade seat. The seal cartridge lays radially between the blade and a lower portion of the slot.

The seal cartridge is coupled to the blade via the at least one arm. The seal cartridge thermally insulates the bottom of the slot from the bottom, or root, of the blade. For purposes of illustration, the present disclosure will be described with respect to a turbine engine. It will be understood, however, that aspects of the disclosure described herein are not so limited and can have general applicability within other engines or within other portions of the turbine engine. For example, the disclosure can have applicability for a rotatable disk, seal cartridge, and blade in other engines or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

Furthermore, as used herein, the term "set" or a "set" of elements can be any number of elements, including only one.

Further yet, as used herein, the term "fluid" or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be other suitable turbine engine such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein.

Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "composite," as used herein is, is indicative of a component having two or more materials. A composite can be a combination of at least two metallic or non-metallic elements or materials; or a combination of metallic and non-metallic elements or materials. Examples of a composite material can be, but are not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term “metallic” as used herein is indicative of a material that includes metal such as, but not limited to, titanium, iron, aluminum, stainless steel, and nickel alloys. A metallic material or alloy can be a combination of at least two or more elements or materials, where at least one is a metal.

FIG. 1 is a schematic cross-sectional diagram of a turbine engine 10 for an aircraft. The turbine engine 10 has a generally longitudinally extending axis or centerline 12 extending forward 14 to aft 16. The turbine engine 10 includes, in a downstream serial flow relationship: a fan section 18 including a fan 20; a compressor section 22 including a booster or low pressure (LP) compressor 24 and a high pressure (HP) compressor 26; a combustion section 28 including a combustor 30; a turbine section 32 including a HP turbine 34 and a LP turbine 36; and an exhaust section 38. The turbine engine 10 as described herein is meant as a non-limiting example. Other architectures are possible, such as, but not limited to, an unducted turbine engine, a steam turbine engine, a supercritical carbon dioxide turbine engine, or any other suitable turbine engine.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10. The engine core 44 generates combustion gases. The engine core 44 is surrounded by a core casing 46, which can be coupled with the fan casing 40.

An HP shaft 48 is disposed coaxially about the engine centerline 12 of the turbine engine 10. The HP shaft 48 drivingly connects the HP turbine 34 to the HP compressor 26. An LP shaft 50 is disposed coaxially about the engine centerline 12 of the turbine engine 10 and within the larger diameter annular HP shaft 48. The LP shaft 50 drivingly connects the LP turbine 36 to the LP compressor 24 and fan 20. The shafts 48, 50 are rotatable about the engine centerline 12 and couple to a plurality of rotatable elements, which can collectively define a rotor 51.

The LP compressor 24 and the HP compressor 26 respectively include a plurality of compressor stages 52, 54. In the compressor stages 52, 54, a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outward relative to the engine centerline 12. The compressor blades 56, 58 extend from a blade platform to a blade tip. The corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage 52, 54 of the compressor 24, 26 can be mounted to (or integral to) a disk 61. The disk 61 is mounted to a corresponding one of the HP and LP shafts 48, 50. The static compressor vanes 60, 62 for a stage 52, 54 of the compressor 24, 26 can be mounted to the core casing 46 in a circumferential arrangement.

The HP turbine 34 and the LP turbine 36 respectively include a plurality of turbine stages 64, 66. In the turbine stages 64, 66, a set of turbine blades 68, 70 are rotated relative to a corresponding set of static turbine vanes 72, 74 to extract energy from the stream of fluid passing through the stage. The set of static turbine vanes 72, 74 are also referred to as a nozzle.

In a single turbine stage 64, 66, multiple turbine blades 68, 70 can be provided in a ring and can extend radially outward relative to the engine centerline 12. The corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71. The disk 71 is mounted to the corresponding one of the HP and LP shafts 48, 50. The turbine vanes 72, 74 for a stage of the compressor can be mounted to the core casing 46 in a circumferential arrangement.

Complementary to the rotor portion, the stationary portions of the turbine engine 10 are also referred to individually or collectively as a stator 63. As such, the stator 63 can refer to the combination of non-rotating elements throughout the turbine engine 10. The stationary portions can include the static vanes 60, 62, 72, 74 of the compressor and turbine sections 22, 32.

It will be appreciated that the turbine engine 10 can be split into at least two separate portions: a rotor portion and a stator portion. The rotor portion can be defined as any portion of the turbine engine 10 that rotates about a respective rotational axis. The stator portion can be defined by a combination of non-rotating elements provided within the turbine engine 10. As a non-limiting example, the rotor portion can include one or more of the plurality of fan blades 42, the compressor blades 56, 58, or the turbine blades 68, 70. As a non-limiting example, the stator portion can include one or more of the plurality of fan vanes 82, the static compressor vanes 60, 62, or the static turbine vanes 72, 74.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components for cooling. The temperature of pressurized airflow 76 entering the combustor 30 is significantly increased above the bleed air temperature. The bleed air 77 may be used to reduce the temperature of the core components downstream of the combustor 30. The bleed air 77 can also be utilized by other systems.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

A remaining portion of the airflow exiting the fan section 18 is referred to as a bypass airflow 78. The bypass airflow 78 bypasses the LP compressor 24 and engine core 44 and exits the turbine engine 10 at a fan exhaust side 84 through a stationary vane row. More particularly, the stationary vane row is an outlet guide vane assembly 80. The outlet guide vane assembly 80 comprises a plurality of airfoil guide vanes 82. More specifically, a circumferential row of radially extending airfoil guide vanes 82 are utilized adjacent the fan section 18 to exert at least some directional control of the airflow 78.

Figure 2:
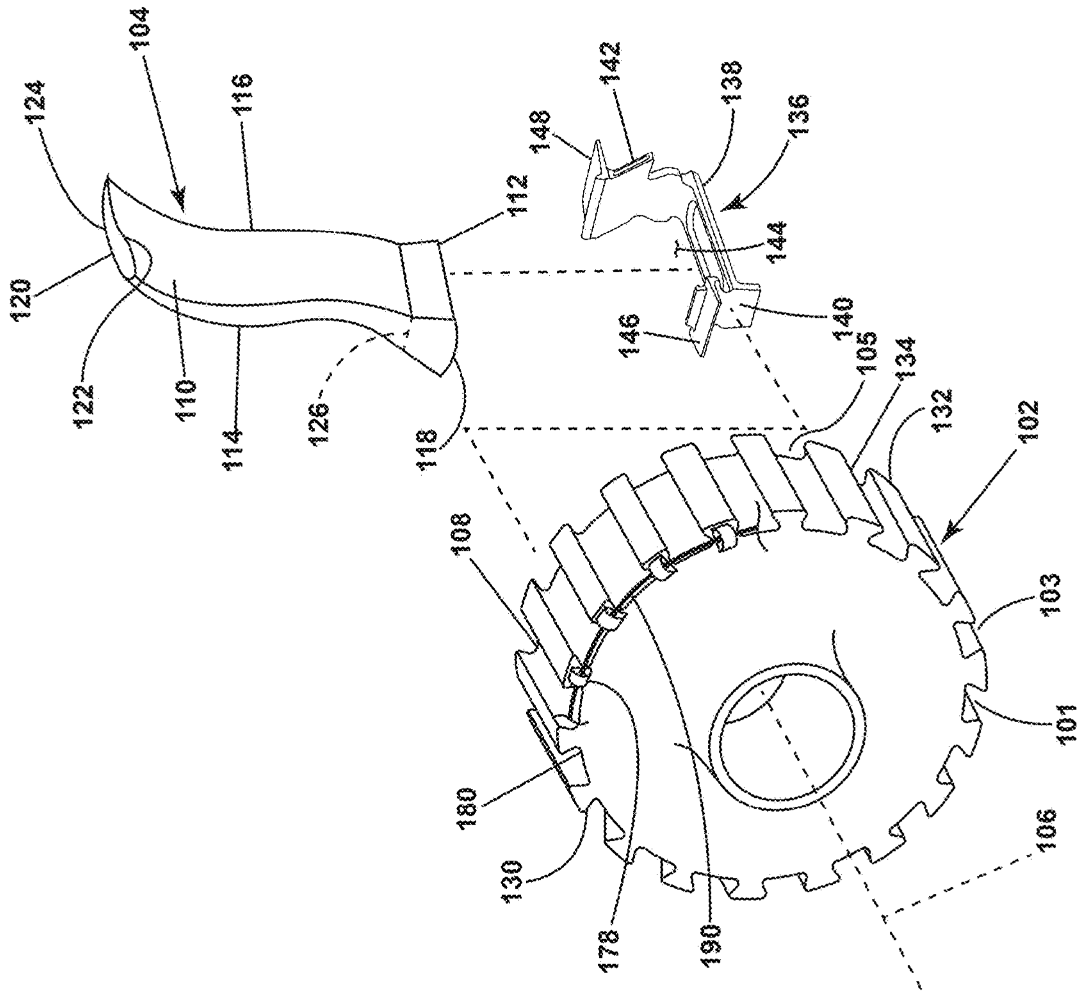
FIG. 2 is a schematic exploded perspective view of a blade assembly including a rotatable disk, a blade and a seal cartridge suitable for use within the turbine engine of FIG. 1, the seal cartridge including a plate partially defining a blade seat for the blade.

FIG. 2 is a schematic perspective view of a blade assembly 100 including a rotatable disk 102, a blade 104, and a seal cartridge 136 suitable for use within the turbine engine 10 of FIG. 1. The rotatable disk 102 is suitable for use as the rotatable disk 61, 71 (FIG. 1) or any other disk such as, but not limited to, a disk within the fan section 18 (FIG. 1) of the turbine engine 10 (FIG. 1). The rotatable disk 102 is rotatable about a rotational axis 106 that can coincide with or be offset from the engine centerline (e.g., the engine centerline 12 of FIG. 1).

The rotatable disk 102 includes a forward surface 130 and an aft surface 132 with a peripheral surface 134 interconnecting the forward surface 130 and the aft surface 132. The rotatable disk 102 includes a plurality of slots 108 formed at the periphery of the rotatable disk 102. The plurality of slots 108 extend between a forward opening 101 formed along the forward surface 130, an aft opening 103 formed along the aft surface 132, and a peripheral opening 105 formed along the peripheral surface 134. Each slot of the plurality of slots 108 extends radially inward from the peripheral surface 134 towards the rotational axis 106 and terminates at a respective slot inner surface 180. Each slot of the plurality of slots 108 extends a total circumferential distance that is less than a total axial distance that the slot extends along the peripheral surface 134.

While illustrated as a plurality of axially-extending slots 108, it will be appreciated that at least a portion of the slots can extend non-axially. As a non-limiting example, the plurality of slots 108 can be circumferentially skewed such that at least one slot of the plurality of slots 108 includes a first portion that is circumferentially displaced from another portion spaced from the first portion. As a non-limiting example, at least one slot of the plurality of slots 108 can include an opening along the forward surface 130 that is circumferentially spaced from an opening on the aft surface 132.

The rotatable disk 102 further comprises an axial retainer assembly 178 provided along the forward surface 130. The axial retainer assembly can include an axial retainer 190 extending circumferentially about the rotational axis 106. The axial retainer 190 overlays the forward opening 101. While only a portion of the axial retainer assembly 178 is illustrated, it will be appreciated that the axial retainer assembly 178 can extend continuously about an entirety of the rotational axis 106. The axial retainer 190 can be continuous or segmented about the rotational axis 106. The axial retainer assembly 178 can be provided along the forward surface 130, the aft surface 132 or a combination thereof.

The blade 104 includes an airfoil portion 110 and a shank 112 extending from the airfoil portion 110. The shank 112 meets the airfoil portion 110 at a transition 126. The shank 112 can define a portion of the blade 104 that flares circumferentially outward from the airfoil portion 110. The shank 112 defines a portion of the blade 104 receivable within a respective slot of the plurality of slots 108.

The airfoil portion 110 extends between a leading edge 114 and a trailing edge 116 to define a chord-wise direction. The blade 104 extends between a root 118 and a tip 120 to define a span-wise direction. The shank 112 terminates radially at the root 118. The airfoil portion 110 includes a pressure side 122 and a suction side 124.

The seal cartridge 136 includes a plate 138 and at least one arm extending radially from the plate 138. The plate 138 is an axially-extending body of the seal cartridge 136. As a non-limiting example, the seal cartridge 136 can include a first arm 140 and a second arm 142, with the second arm 142 axially spaced from the first arm 140. While two arms, the first arm 140 and the second arm 142, are illustrated, it will be appreciated that the seal cartridge 136 can include one or more arms that extend radially from the plate 138.

The plate 138, the first arm 140, and the second arm 142 can be formed as a unitary body. As used herein, the term "unitary body" refers to a single component or assembly of components that are physically touching to collectively define a singular body. As a non-limiting example, the plate 138, the first arm 140 and the second arm 142 can form a unitary body by being unitarily formed (e.g., formed as a single, continuous piece), coupled to each other (e.g., the first arm 140 or the second arm 142 can be coupled the plate 138), or a combination thereof. In terms of the unitary body being defined by bodies coupled to one another, the coupling can be done through, but is not limited to, welding, adhesion, bonding, clamping, fastening, or a combination thereof. As a non-limiting example, the first arm 140, the second arm 142 and the plate 138 can be formed as cast, molded, printed (e.g., 3-D printing), or a combination thereof into the unitary body.

The seal cartridge 136 defines a blade seat 144 adapted to house a respective portion of the blade 104. The plate 138 and the at least one arm collectively define the blade seat 144. The blade seat 144 can be sized to seat any suitable portion of the blade 104. As a non-limiting example, the blade seat 144 can be sized to seat the shank 112, specifically the root 118 of the shank 112.

The seal cartridge 136 can include at least one body extending axially from at least one of the first arm 140 or the second arm 142. As a non-limiting example, the first arm 140 can include a first retention body 146 that extends axially forward from the first arm 140, and the second arm 142 can include a second retention body 148 that extends axially rearward from the second arm 142. When the blade 104 is provided within the blade seat 144, the first retention body 146 and the second retention body 148 each extend beyond a respective portion of the blade 104, specifically the shank 112, in the axial direction. The first retention body 146 and the second retention body 148 are used to retain the seal cartridge 136 to the blade 104. The first retention body 146 and the second retention body 148 can take any suitable form. As a non-limiting example, the first retention body 146 and the second retention body 148 can each be formed as angel wings.

The seal cartridge 136 can be coupled to the blade 104 by inserting the blade 104 into the blade seat 144. The blade 104 and the seal cartridge 136 are both coupled to the rotatable disk 102 by inserting the shank 112 and the seal cartridge 136 into a respective slot of the plurality of slots 108. It is contemplated that the seal cartridge 136 can be sized to fit within a respective slot of the plurality of slots 108. As a non-limiting example, the lower parts of the first arm 140 and the second arm 142 can match the cross section of the respective slot, such that the seal cartridge 136 sits flush against the respective slot. Alternatively, a gap can be found between the respective slot and the seal cartridge 136. As a non-limiting example, the seal cartridge 136 slides into the forward opening of the slot, 138 first, and axial position in the slot is set by where the first arm 140 contacts the forward surface 130 of the rotatable disk 102. The airfoil portion 110 extends radially outward from the peripheral surface 134 through the peripheral opening 105. The seal cartridge 136 and the blade 104 are held in place by frictional contact with the slot 108 or can be coupled to the slot 108 via any suitable coupling method such as, but not limited to, welding, adhesion, fastening, or the like. The axial retainer assembly 178, specifically the axial retainer 190, keeps the seal cartridge 136, and therefore the blade 104, within the slot 108.

While only a single blade 104 and a single seal cartridge 136 are illustrated, it will be appreciated that there can be any number of one or more blades 104 and accompanying seal cartridges 136 in the blade assembly 100. As a non-limiting example, the total number of blades 104 and seal cartridges 136 can correspond to the total number of slots in the plurality of slots 108.

While described as the blade 104 being mounted to a rotatable disk 102, it will be appreciated that the blade 104 can be any suitable static or rotating airfoil. In terms of the former, the blade 104 can be mounted to a static body, as opposed to the rotatable disk. As such, the blade 104 can be at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42. In the instance where the blade 104 is mounted to a stationary component of the turbine engine 10, the body identified by the rotatable disk 102 can be any suitable stationary portion of the turbine engine 10 that the blade 104 is couplable to, such as, but not limited to, a band, a shroud, a casing, or the like.

The blade assembly 100 can be made of any suitable material. As a non-limiting example, the blade 104 can include a composite material such that the blade 104 can be defined as a composite blade. As a non-limiting example, the rotatable disk 102 can include a metallic material such that the rotatable disk 102 can be defined as a metallic disk. As a non-limiting example, the seal cartridge 136 can include a metallic material such that the seal cartridge 136 can be defined as a metallic seal cartridge.

Figure 3:
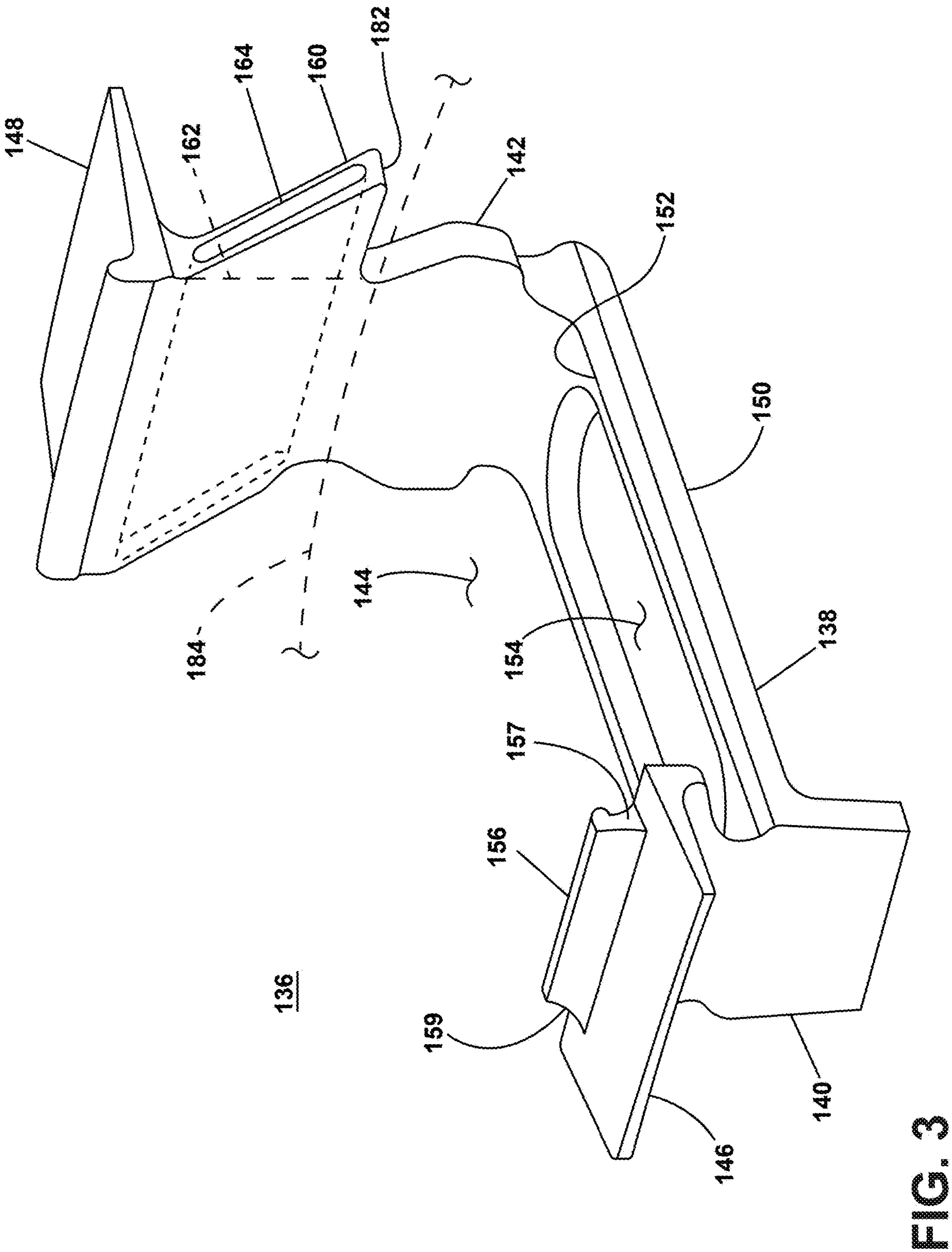
FIG. 3 is a schematic top perspective view of the seal cartridge of FIG. 2, further illustrating a pocket formed along the plate and adapted to receive the blade.

FIG. 3 is a schematic top perspective view of the seal cartridge 136 of FIG. 2. The plate 138 includes a plate lower surface 150 and a plate upper surface 152. A pocket 154 can be formed along the plate upper surface 152.

At least one of the first arm 140 or the second arm 142 can include a stop 156. As a non-limiting example, the first arm 140 can include a stop 156. The stop 156 can press against the blade 104 (FIG. 2), when the blade is received within the blade seat 144, and hold the seal cartridge 136 in frictional contact with the blade 104. The stop 156 can define a portion of the seal cartridge 136 that comes into direct contact with the blade 104 when the blade 104 is received within the blade seat 144. The stop 156 can extend circumferentially between a first end 157 and a second end 159. The first end 157 and the second end 159 can be circumferentially spaced from or sit flush with circumferential ends of the first arm 140.

At least one of the first arm 140 or the second arm 142 can include a protrusion 160 extending from the first arm 140 or the second arm 142. As a non-limiting example, the second arm 142 includes the protrusion 160. The protrusion 160 is defined by a region of the second arm 142 that extends circumferentially away from the second arm 142. The protrusion 160 includes a triangular cross-sectional area when viewed along a plane perpendicular to the rotational axis 106 (FIG. 2) and intersecting the protrusion 160. For purposes of illustration, a division 162 between the protrusion 160 and a remainder of the second arm 142 is illustrated. While illustrated as including a triangular cross-sectional area, it will be appreciated that the cross-sectional area can be any suitable shape configured to create the protrusion 160 along the seal cartridge 136. Alternatively, the protrusion 160 can be excluded from the seal cartridge 136 in some assemblies. As a non-limiting example, the protrusion 160 can be excluded when the rotatable disk 102 does not include a skewed slot.

The protrusion 160 can include a radially inner surface 182 that confronts the peripheral surface 134 (FIG. 2) of the rotatable disk 102 (FIG. 2). For purposes of illustration, a perimeter 184 of the rotatable disk 102 defined by the peripheral surface 134 has been illustrated. The radially inner surface 182 can be spaced from or contact the peripheral surface 134. The radially inner surface 182 can be formed such that it follows the contour of the perimeter 184 defined by the peripheral surface 134.

The seal cartridge 136 includes a seal channel 164 extending circumferentially through at least one arm of the seal cartridge 136. As a non-limiting example, the seal channel 164 extend circumferentially through the second arm 142. As a non-limiting example, the seal channel 164 can extend through the protrusion 160.

Figure 4:
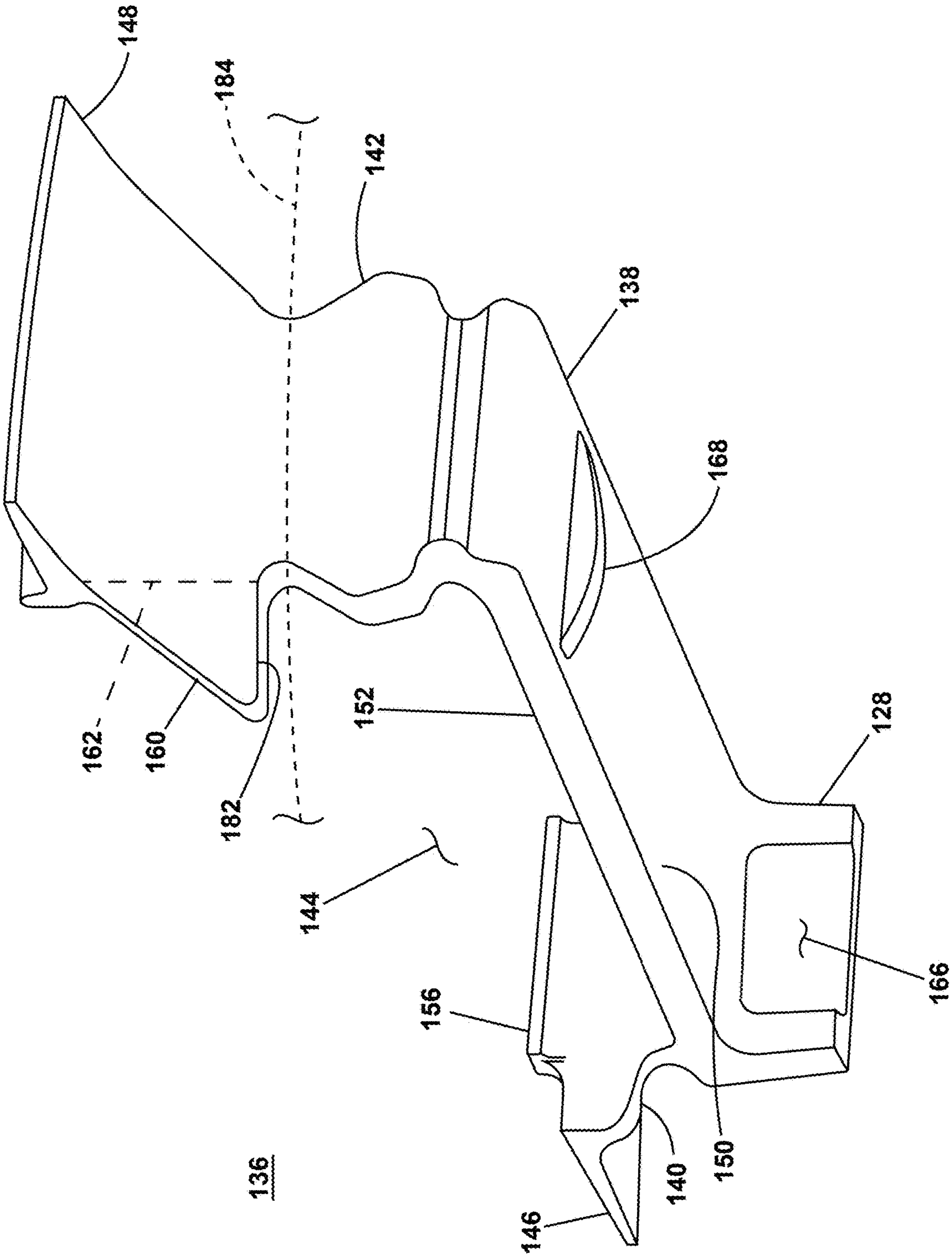
FIG. 4 is a schematic bottom perspective view of the seal cartridge of FIG. 2, further illustrating a flow passage formed along a respective portion of the seal cartridge.

FIG. 4 is a schematic bottom perspective view of the seal cartridge 136 of FIG. 2. The seal cartridge 136 can include a third arm 128 that extends radially inward from the plate 138.

When assembled with the rotatable disk (FIG. 2), the third arm 136 can define an axial stop of the seal cartridge 136. The third arm 128 can be a continuation of one of the first arm 140 or the second arm. At least one flow passage 166 can be provided within the third arm 128. The seal cartridge 136 can further include a flow meter 168 defining an additional arm that extends radially inwardly from the plate 138. The flow meter 168 can be provided aft of or downstream of the at least one flow passage 166. Alternatively, the at least one flow passage 166 can act as flow meter such that the flow meter 168 is not required. During operation, a flow of fluid can flow between the seal cartridge 136, specifically the lower surface 150, and the rotatable disk 102 (FIG. 2). The flow meter 168 can be used to control a rate at which the fluid flows between the seal cartridge 136 and the rotatable disk 102. The flow meter 168 can further act as a leg extending from the plate 138 that defines a radial stop. In other words, the flow meter 168 can contact a portion of the disk 102 and space the plate 138 from the disk 102.

Figure 5:
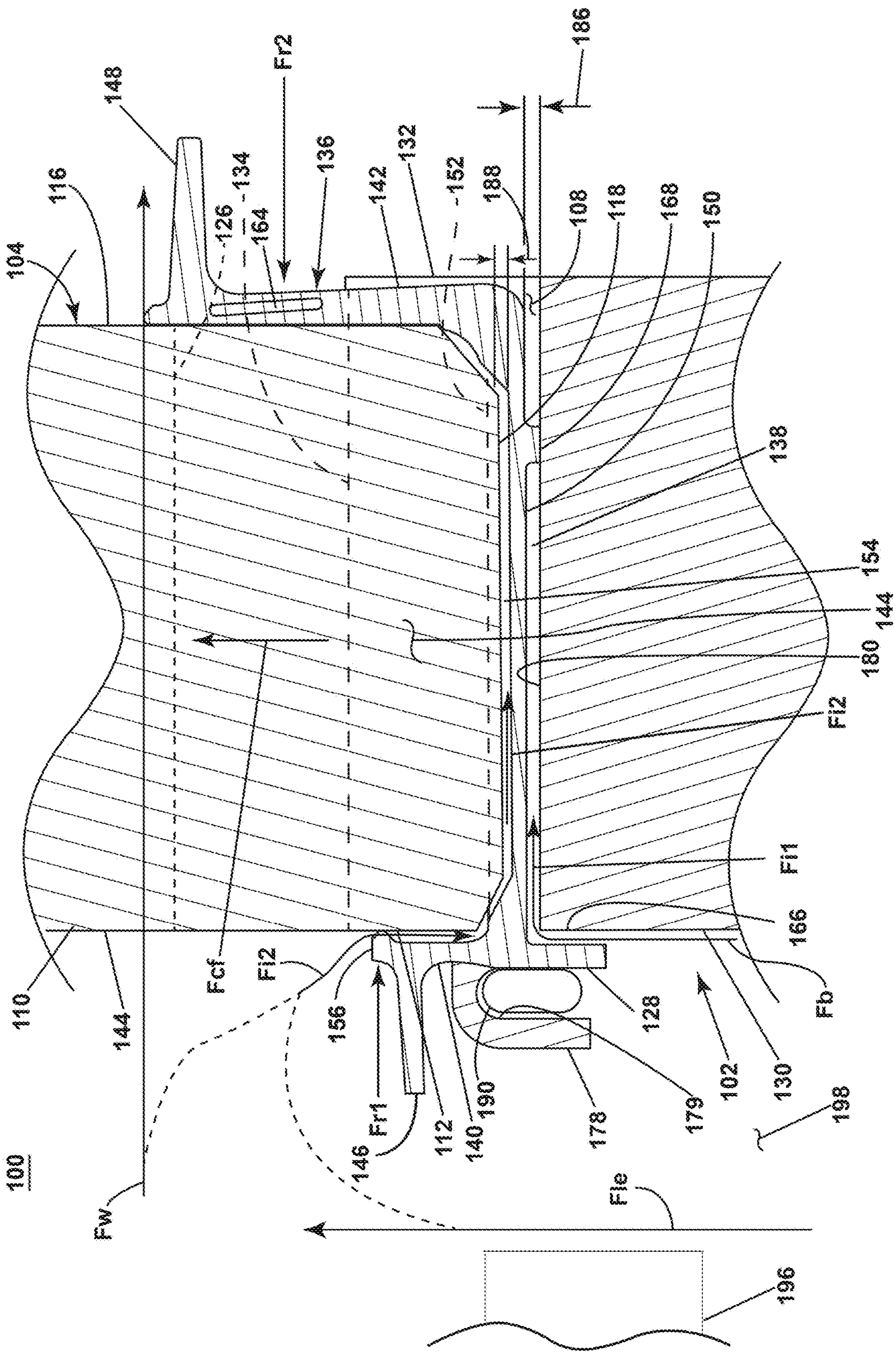
FIG. 5 is a schematic side cross-sectional assembled view of the blade assembly of FIG. 2, further illustrating a first flow passage and a second flow passage formed between the seal cartridge and the rotatable disk, and the seal cartridge and the blade, respectively.

FIG. 5 is a schematic side cross-sectional view of the blade assembly 100 of FIG. 2 viewed from the circumferential direction. The shank 112 is received at least partially in the blade seat 144. The seal cartridge 136 and the shank 112 are received within a respective slot of the plurality of slots 108. At least a portion of the shank 112 can extend into the pocket 154. Alternatively, the pocket 154 can define a region where the shank 112 does not extend into.

The rotatable disk 102 and the seal cartridge 136 can be coupled to one another through any suitable method. As a non-limiting example, an axial retainer assembly 178 can be coupled to or integrally formed with a respective portion of the rotatable disk 102. The axial retainer assembly 178 includes a retainer slot 179 that an axial retainer received within the retainer slot 179. The axial retainer 190 can apply a force against the retainer slot 179 and a respective portion of the seal cartridge 136 (e.g., the first arm 140 and the third arm 128) and retain the seal cartridge 136 in the illustrated position. The axial retainer assembly 178 can prevent the seal cartridge 136 from moving axially within the slot 108.

The axial retainer 190 can be any suitable device configured to retain the seal cartridge 136 to the rotatable disk 102. As a non-limiting example, the axial retainer 190 can be a retainer ring. The axial retainer 190 can contact any suitable portion of the seal cartridge 136. As a non-limiting example, the axial retainer 190 can contact the first arm 140. The axial retainer 190 can be provided along a side of the rotatable disk 102 corresponding to at least one of the forward surface 130 or the aft surface 132. As a non-limiting example, the blade assembly 100 can include two axial retainers: one provided along a portion of the rotatable disk 102 corresponding to the forward surface 130 and another provided along a portion of the rotatable disk 102 corresponding to the aft surface 132. Alternatively, the rotatable disk 102 and the seal cartridge 136 can be coupled to each other through any suitable method such as, but not limited to, welding, adhesion, fastening, or a combination thereof.

The axial retainer 190 can be a split ring retainer such that each seal cartridge 136 or each set of seal cartridges 136 includes a respective axial retainer 190. As such, the axial retainer 190 can be included within a plurality of axial retainers segmented circumferentially about the rotational axis 106. Alternatively, the axial retainer 190 can be a continuous retainer that retains each seal cartridge 136 of the blade assembly 100 to a respective portion of the rotatable disk 102.

The first arm 140 extends radially along the leading edge 114 of the blade 104. The second arm 142 extends radially along the trailing edge 116 of the blade 104. The plate 138 extends axially along the root 118. The first arm 140 and the second arm 142 can terminate radially inward of, in conjunction with, or radially outward of the transition 126 between the airfoil portion 110 and the shank 112.

A first gap 186 is formed between the seal cartridge 136 and the rotatable disk 102. The first gap 186 is formed by the axial space between the third arm 128 and the forward surface 130 (e.g., the space formed by the cooling passage 166), and between the lower surface 150 and the radially inner surface 180. The flow meter 168 can extend through the first gap 186. A second gap 188 is formed between the seal cartridge 136 and the shank 112. The second gap 188 is formed between an axial space between the first arm 140 and the shank 112, and between the upper surface 152 and the root 118. The second gap 188 can be at least partially formed by the pocket 154.

The first gap 186 and the second gap 188 can be any suitable size. As a non-limiting example, the first gap 186 and the second gap 188 can each be large enough to allow a fluid (e.g., air) to pass therethrough. The first gap 186 and the second gap 188 can further be size by any suitable portion of the blade assembly 100. As a non-limiting example, the flow meter 168, specifically the radial extent of the flow meter 168, can be sized to determine the size of the first gap 186. As a non-limiting example, the size of the pocket 154 can define the size of the second gap 188.

During operation of the turbine engine (e.g., the turbine engine 10 of FIG. 1) that the blade assembly 100 is provided within, a working airflow (Fw) can flow over the blade 104, such as over the airfoil portion 110. Due to the shaping of the airfoil portion 110, the blade 104 can extract work from the working airflow (Fw) and be used to either drive the rotatable disk 102; or be driven by the rotatable disk 102 and compress the working airflow (Fw) as it flows from the leading edge 114 to the trailing edge 116.

It is contemplated that the blade assembly 100 can be provided downstream of an upstream assembly 196. The upstream assembly 196 can be any suitable assembly such as, but not limited to, a blade assembly including a blade or a vane. A secondary airflow path 198 can be formed between the upstream assembly 196 and the blade assembly 100. During operation, a leakage airflow (Fle) can flow through the secondary airflow path 198 and merge with the working airflow (Fw). The movement of the leakage airflow (Fle) from the secondary airflow path 198 can push the working airflow (Fw) away from the rotatable disk 102 and prevent the working airflow (Fw) from flowing down towards the seal cartridge 136. Alternatively, at least a portion of the working airflow (Fw) can flow towards the seal cartridge 136 as illustrated in phantom lines.

It is contemplated that the leakage airflow (Fle) can further be defined by its temperature with respect to the working airflow (Fw). Specifically, the leakage airflow (Fle) has a lower temperature than a temperature of the working airflow (Fw).

It is contemplated that the working airflow (Fw) can be defined by the hot combustion gases created as a byproduct of combustion. As such, the working airflow (Fw) will heat portions of the blade assembly 100 that the working airflow (Fw) comes into contact with. As discussed herein, the blade 104 can include a composite material and the rotatable disk 102 can include a metallic material. Some composite materials can heat up significantly faster and retain heat for significantly longer than metallic materials. With such composite materials, the blade 104 will be hotter than and stay hotter than the rotatable disk 102. Composite materials, however, have been found to have the highest strength when uniformly heated as opposed to having some areas significantly hotter or colder than other areas. In other words, composite materials perform best when there is a low thermal gradient experienced along the composite material. However, as certain portions of the rotatable disk 102 that do not come into direct contact with the working airflow (Fw) are colder than the blade 104. As a non-limiting example, contact between the shank 112, and the slot inner surface 180 can cool down the shank 112. The cooling down of the shank 112, in turn, results in a thermal gradient being experienced along the blade 104.

The seal cartridge 136, however, provides thermal insulation between the disk (e.g., the slot inner surface 180) and the root 118 of the shank 112. The thermal insulation provided by the seal cartridge 136 reduces or eliminates a thermal gradient across the blade 104. Accordingly, potential damage to the blade 104 and the rotatable disk 102 can be reduced or eliminated.

The first gap 186 (the spacing between the seal cartridge 136 and the rotatable disk 102) defines a first thermal passage. The second gap 188 (the spacing between the seal cartridge 136 and the shank 112) forms a second thermal passage. The first thermal passage and the second thermal passage insulate the blade 104, the rotatable disk 102 and the seal cartridge 136 from one another. The seal cartridge 136 is configured to direct fluid through the thermal passages to define layers of insulation between the seal cartridge 136 and the rotatable disk 102, and between the seal cartridge 136 and the blade 104.

As a non-limiting example, the seal cartridge 136 is configured to direct a first flow of insulating fluid (Fi1) through the first thermal passage and a second flow of insulating fluid (Fi2) through the second thermal passage. The first thermal passage directs the first flow of insulating fluid (Fi1) between the seal cartridge 136 and the rotatable disk 102. The second thermal passage directs the second flow of insulating fluid (Fi2) between the seal cartridge 136 and the blade 104. The second insulating fluid (Fi2) can flow around the stop 156 (e.g, around the first end 157, the second end 159, or a combination thereof), through a gap between the stop 156 and the shank 112, through channels (not illustrated) formed within the stop 156, around the first arm 140, or a combination thereof. The first flow of insulating fluid (Fi1) and the second flow of insulating fluid (Fi2) limit a transfer of heat between the rotatable disk 102 and the seal cartridge 136, and between the blade 104 and the seal cartridge 136, respectively.

The first thermal passage can be fluidly coupled to a bleed air (Fb). The bleed air (Fb) can be any suitable air that has a lower temperature than the working airflow (Fw). The bleed air (Fb), for example, can be an air that is drawn from an upstream section of the turbine engine 10. Alternatively, the bleed air (Fb) can be drawn from the leakage air (Fle). It will be appreciated that the bleed air (Fb) can include the leakage air (Fle), a bleed air form upstream of the blade assembly 100, or a combination thereof.

It is further contemplated that the seal cartridge 136 can be hotter than the rotatable disk 102, and the first flow of insulating fluid (Fi1) can then be used to cool the plate lower surface 150 of the seal cartridge 136 to limit any heat transfer between the rotatable disk 102 and the plate lower surface 150 of the seal cartridge 136. The flow meter 168 can be provided within the first thermal passage to effectively meter, retard, or otherwise prevent uncontrolled egress of the first flow of insulating fluid (Fi1) from the first thermal passage.

At least one of the working airflow (Fw) or the leakage airflow (Fle) is directed by the second thermal passage to provide the second flow of insulating fluid (Fi2). Whatever airflow is funneled into the second thermal passage defines the second flow of insulating fluid (Fi2). The second insulating fluid flow (Fi2) can flow between the first arm 140 and the shank 112 and into the second thermal passage. The second insulating fluid flow (Fi2) within the second thermal passage can form a layer of insulation between the plate upper surface 152 of the seal cartridge 136 and the root 118, thus reducing or eliminating heat transfer between the seal cartridge 136 and the blade 104. The second insulating fluid flow (Fi2) within the second thermal passage can further heat the root 118, surrounding portions of the rotatable disk 102 and the plate upper surface 152 of the seal cartridge 136 to help these regions be at a similar temperature, thus reducing the heat transfer at the root 118 and overall decreasing the thermal gradient across the blade 104.

For purposes of illustration, the fluid entering the second thermal passage has been shown to come from both the leakage airflow (Fle) and the working airflow (Fw) as phantom lines. The second thermal passage can be coupled to either the leakage airflow (Fle), the working airflow (Fw), or a combination thereof depending on the location of the blade assembly 100. As a non-limiting example, if the blade assembly 100 is provided within the compressor section 22, the second thermal passage can be fluidly coupled to the working airflow (Fw), the leakage airflow (Fle), or a combination thereof. As a non-limiting example, if the blade assembly is provided within the turbine section 32 (FIG. 1), the second thermal passage can be fluidly coupled to the leakage airflow (Fle). The determination of what the second thermal passage is fluidly coupled to may be based on the temperature of the working airflow (Fw). As a non-limiting example, the working airflow (Fw) in the turbine section 32 is hotter than the working airflow (Fw) in the compressor section 22. The temperature of the working airflow (Fw) in the turbine section 32 may be too hot to supply to the second thermal passage while the temperature of the working airflow (Fw) in the compressor section 24 may be low enough to supply to the second thermal passage.

While described in terms of a thermal gradient experienced across the blade 104 due to the blade 104 being hotter than the rotatable disk 102, it will be appreciated that the situation can be reversed. As non-limiting example, it is contemplated that the rotatable disk 102 can be hotter than the blade 104. In either case (e.g., the blade 104 is hotter or colder than the rotatable disk 102), the seal cartridge 136 is used to form a thermal insulation between the blade 104 and the rotatable disk 102.

During operation, the blade 104 can rotate about the rotational axis 106. This rotation, in turn, transfers a centrifugal force (Fcf) to the seal cartridge 136. The centrifugal forces (Fcf) create a moment on the first retention body 146 and the second retention body 148. This moment, in turn, creates a first retention force (Fr1) and a second retention force (Fr2). The first retention force (Fr1) forces the first arm 140 against the shank 112 in the direction indicated by the arrow of the first retention force (Fr1). The second retention force (Fr2) forces the second arm against the shank 112 in the direction indicated by the arrow of the second retention force (Fr2). the first arm 140 and the second arm 142 towards the shank 112, thus securing the seal cartridge 136 to the shank 112. It is contemplated that the larger an axial extent of the first retention body 146 and the second retention body 148, the larger the moment and thus the tighter the first arm 140 and the second arm 142 are pressed against the shank 112. While described in terms of the first retaining force (Fr1) and the second retaining force (Fr2) being used to secure the seal cartridge 136 to the blade 104, it will be appreciated that the seal cartridge 136 can be secured to the blade 104 through any suitable method such as, but not limited to, adhesion, fastening, clamping, welding, bonding, or a combination thereof. Further, it will be appreciated that only a single arm of the seal cartridge 136 can be sufficient to secure to secure the seal cartridge 136 to the blade 104.

It is contemplated that the heating of the blade 104, the seal cartridge 136, and the rotatable disk 102 can cause thermal expansion of the blade 104, the seal cartridge 136, or the rotatable disk 102. As the seal cartridge 136 is coupled to the rotatable disk 102 and is formed such that at least the first retaining force (Fr1) or the second retaining force (Fr2) is generated during rotation of the blade assembly 100, the blade 104 will not become dislodged from either of the rotatable disk 102 or the seal cartridge 136.

Figure 6:
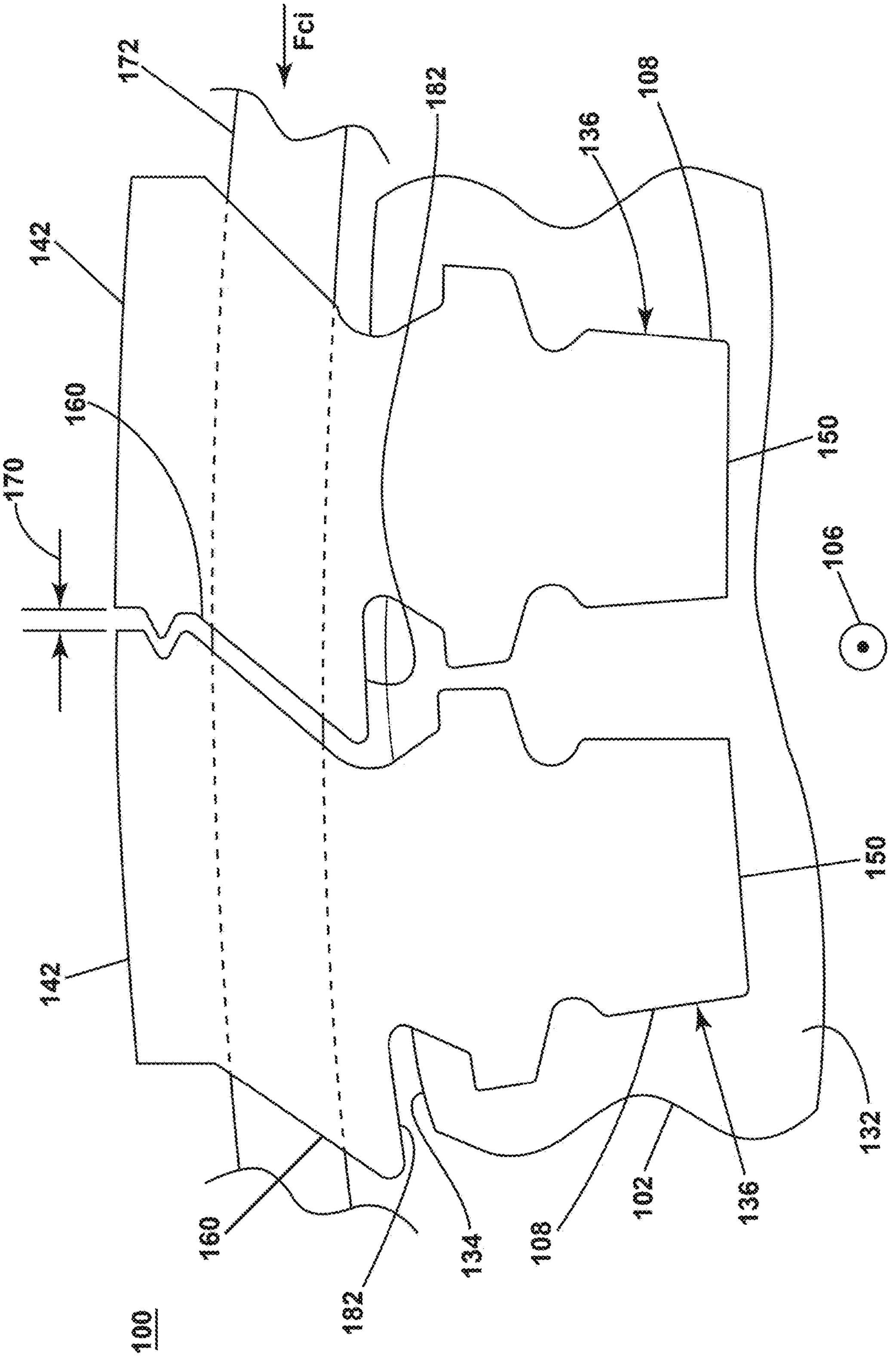
FIG. 6 is a rear schematic view of the blade assembly of FIG. 2 with the blade removed, further illustrating two circumferentially adjacent seal cartridges with a spline seal extending therebetween.

FIG. 6 is a forward-facing schematic view of an aft end of the blade assembly 100 of FIG. 2 with the blade 104 (FIG. 2) removed. As illustrated, the blade assembly 100 includes two circumferentially adjacent seal cartridges 136. The seal cartridges 136 can collectively form a segmented body that extends circumferentially about the rotational axis 106. The seal cartridges 136 can be segmented about an entirety of the rotational axis 106.

The circumferentially adjacent seal cartridges 136 are spaced from one another to define a circumferential gap 170 therebetween. A seal 172 can be provided to seal an airflow (e.g., the working airflow (Fw) or the leakage airflow (Fle) of FIG. 5) from flowing through the circumferential gap 170. The prevention of the airflow from flowing through the circumferential gap 170 can in turn force a larger volume of the working airflow flows over the blade 104 (FIG. 2). The larger the volume of air flowing over the blade 104, the more work that the blade 104 extracts from the working airflow (Fw). The seal 172 can extend circumferentially through the seal channel 164 (FIG. 3) of each seal cartridge 136. The seal 172 can extend continuously or non-continuously circumferentially about the rotational axis 106. The seal 172 can be any suitable seal such as, but not limited to, a spline seal. While shown as extending circumferentially from and through the second arm 142, it will be appreciated that the seal 172 can be provided along any suitable portion of the seal cartridge 136 such as, but not limited to, the first arm 140, the second arm 142 or a combination thereof. While illustrated as a circumferential gap 170 having a constant circumferential distance between opposing portions of the seal cartridges 136, it will be appreciated that the circumferential gap 170 can be non-constant.

The protrusion 160 can further be used to limit or otherwise prevent the flow of fluid between the seal cartridges 136. As a non-limiting example, each seal cartridge 136 can include a body (e.g., the protrusion 160) that extends circumferentially along the rotatable disk 102, thus creating a barrier to the flow of fluid between adjacent seal cartridges 136.

During operation of the turbine engine (e.g., the turbine engine 10 of FIG. 1) that the blade assembly 100 is provided within, the rotation of the blade assembly 100 can cause the seal cartridge 136 to experience a circumferential force (Fci) in a direction opposite the direction of rotation. The circumferential force (Fci) can be cause, for example, by a drag of the blade assembly 100. The circumferential force (Fci) can create a moment on the seal cartridge 136, which can cause the seal cartridge 136 to turn in the slot 108 in the direction indicated by the arrow of the circumferential force (Fci). To counteract the circumferential force (Fci), each seal cartridge 136 includes a respective protrusion 160. The protrusion 160 is sized and positioned to limit the effects of the circumferential force (Fci). This, in turn, reduces or eliminates the potential for the seal cartridge 136 to be damaged by the circumferential force (Fci).

Benefits of the presented disclosure include a blade with a reduced or eliminated thermal gradient when compared to a traditional blade. For example, traditional blades, specifically traditional blades including a composite material, will experience a large thermal gradient due to the difference of temperature between the traditional blade and the rotatable disk that the traditional blade is received within. The blade assembly as described herein, however, includes the seal cartridge that forms an insulative barrier through the seal cartridge itself and through the first thermal passage and the second thermal passage between the blade and the rotatable disk. These layers of insulation ultimately created by the seal cartridge help to reduce or eliminate the thermal gradient experienced across the blade is minimal and does not damage the blade when compared to the traditional blade. Further, the flows of insulating fluid can be used to heat or cool respective portions of the blade assembly. As a non-limiting example, the first flow of insulation fluid can be used to cool the rotatable disk 102, thus minimizing the thermal gradient along the disk. As a non-limiting example, the second flow of insulating fluid can be used to heat the blade, thus minimizing the thermal gradient along the blade.

Additional benefits of the presented disclosure include a seal cartridge that couple the blade to the rotatable disk. For example, traditional assemblies can include a seal provided between the blade and the rotatable disk, and separate elements that effectively couples the blade to the rotatable disk. The blade assembly as described herein, however, includes the seal cartridge defined by a unitary body including both a seal (e.g., the plate, the first arm and the second arm) and a retaining feature (e.g., the first arm, the second arm and the third arm), such that the seal cartridge effectively provides a layer of insulation between the blade and the rotatable disk while also retaining the blade to the rotatable disk without the need for additional separate clamping elements.

Additional benefits associated with the use of a composite blade include a lighter assembly without sacrificing performance of the blade assembly when compared to a traditional assembly including a non-composite (e.g., cast) blade. In other words, the material used for the composite blade is lighter than the materials used for the non-composite blade and do not sacrifice the ability to perform as intended within the turbine engine. The decreased weight of the blade, and thus the blade assembly as a whole, in turn, means an increased efficiency of the turbine engine when compared to a conventional turbine engine including the non-composite blade.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A blade assembly for a turbine engine, the blade assembly comprising a rotatable disk including a peripheral surface, a slot formed along the peripheral surface, and a rotational axis, a seal cartridge including a plate at least partially received within the slot, and a first arm extending radially from the plate, the plate being spaced from the rotatable disk to define a first gap therebetween, and a blade including a root, a leading edge, and a trailing edge, the root being spaced from the plate to define a second gap therebetween, wherein the root is received within the slot, the plate is between the root and the rotatable disk, the first arm extends radially and is located at one of the leading edge or the trailing edge of the blade, a first thermal passage is at least partially defined by the first gap, and a second thermal passage is at least partially defined by the second gap.

An blade assembly for a turbine engine, the blade assembly comprising a rotatable disk having a peripheral surface, with at least one slot located in the peripheral surface, a seal cartridge having a plate at least partially received within the slot, the seal cartridge having a first arm extending radially from the plate, the plate and the first arm defining a blade seat, and a blade having a root, a leading edge and a trailing edge, the root being received within the blade seat, with the first arm extending radially along at least a portion of one of the leading edge or the trailing edge, the first arm and the seal cartridge forming a unitary body.

An blade assembly for a turbine engine, the turbine engine having a working airflow pathway, the blade assembly comprising a working airflow pathway, a rotatable disk having a peripheral surface, with at least one slot located in the peripheral surface, a seal cartridge having a plate at least partially received within the slot and defining a blade seat, the plate being spaced from the rotatable disk to define a first gap therebetween, and a blade at least partially provided within the working airflow path, the blade having a root, a leading edge and a trailing edge, the root being received within the blade seat, the root being spaced from the plate to define a second gap therebetween wherein a first thermal passage at least partially defined by the first gap, the first thermal passage being fluidly coupled to a leakage airflow from the working airflow path, a second thermal passage at least partially defined by the second gap, the second thermal passage being fluidly coupled to a bleed air from a portion of the turbine engine upstream of the blade.

The blade assembly of any preceding clause, wherein the first arm and the seal cartridge form a unitary body.

The blade assembly of any preceding clause, wherein the blade comprises a shank terminating at the root, and the plate comprises a pocket that receives the shank.

The blade assembly of any preceding clause, wherein the first arm includes a retention body extending axially away from the blade.

The blade assembly of any preceding clause, wherein the retention body is an angel wing.

The blade assembly of any preceding clause, wherein the first arm provides a retention force against the blade.

The blade assembly of any preceding clause, wherein the seal cartridge includes a second arm, the second arm is axially-spaced rearwardly from the first arm, the second arm extends radially from the plate, and the blade is received on the plate and between the first arm and the second arm.

The blade assembly of any preceding clause, wherein the first arm and the second arm each include a respective retention body extending axially away from the blade.

The blade assembly of any preceding clause, wherein the rotatable disk includes a forward surface, and the seal cartridge includes a second arm extending radially inwardly form the plate along the forward surface.

The blade assembly of any preceding clause, wherein the seal cartridge includes at least one flow passage formed within the second arm, the at least one flow passage defining a respective portion of the second gap.

The blade assembly of any preceding clause, wherein the seal cartridge includes a flow meter provided downstream of the at least one flow passage and extending radially inward from the plate, through the gap and contacting the rotatable disk.

The blade assembly of any preceding clause, further comprising an axial retainer assembly including a retainer slot and an axial retainer provided within the retainer slot, the axial retainer confronting a respective portion of the seal cartridge to retain the seal cartridge to the rotatable disk.

The blade assembly of any preceding clause, wherein the axial retainer assembly is integrally formed with the rotatable disk.

The blade assembly of any preceding clause, wherein the seal cartridge comprises the first arm extending along a forward portion of the plate, a second arm extending radially outward from an aft portion of the plate, axially opposite the forward portion, and a third arm extending radially inward from the forward portion, with the first arm, the second arm and the third arm formed as a unitary body.

The blade assembly of any preceding clause, wherein the rotatable disk incudes a plurality of circumferentially spaced slots, the blade is provided within a plurality of circumferentially spaced blades, with each blade of the plurality of circumferentially spaced blades including a respective root provided within a respective slot of the plurality of circumferentially spaced slots, and the seal cartridge is included within a plurality of circumferentially spaced seal cartridges, with each circumferentially adjacent seal cartridge of the plurality of circumferentially spaced seal cartridges being circumferentially spaced from each other to define a seal gap therebetween.

The blade assembly of any preceding clause, further comprising a spline seal extending circumferentially through and outward from the first arm.

The blade assembly of any preceding clause, wherein the spline seal extends circumferentially about an entirety of the rotational axis.

The blade assembly of any preceding clause, wherein the first arm includes a protrusion extending from the first arm, the protrusion having a radially inner surface that follows a contour of the peripheral surface, the protrusion configured to contact the peripheral surface during operation of the blade assembly.

The blade assembly of any preceding clause, wherein the blade includes a composite material, and the rotatable disk includes a metallic material.

The blade assembly of any preceding clause, wherein the turbine engine further comprises a turbine section, with the blade and the rotatable disk being provided with the turbine section.

What is claimed is:

1. A blade assembly for a turbine engine, the blade assembly comprising:

a rotatable disk including a peripheral surface, a slot formed along the peripheral surface, and a rotational axis;

a seal cartridge including a plate at least partially received within the slot, and an arm extending radially from the plate, the plate being spaced from the rotatable disk to define a first gap therebetween; and a blade including a root, a leading edge, and a trailing edge, the root being spaced from the plate and a respective portion of the arm to define a second gap therebetween;

wherein:

the root is received within the slot, the plate is between the root and the rotatable disk, the arm extends radially along at least a portion of the blade;

a first thermal passage is at least partially defined by the first gap, the first thermal passage forming a first fluid passage having a first fluid inlet formed between the seal cartridge and the rotatable disk, the first thermal passage configured to direct a first flow of insulating fluid through the first gap; and a second thermal passage is at least partially defined by the second gap, the second thermal passage forming a second fluid passage having a second fluid inlet formed between the seal cartridge and a respective portion of the blade, the second thermal passage being configured to direct a second flow of insulating fluid through the second gap.

2. The blade assembly of claim 1, wherein the blade comprises a shank terminating at the root, and the plate comprises a pocket that receives the shank.

3. The blade assembly of claim 1, wherein the arm includes a retention body extending axially away from the blade.

4. The blade assembly of claim 3, wherein the retention body is an angel wing.

5. The blade assembly of claim 1, wherein the arm provides a retention force against the blade.

6. The blade assembly of claim 1, wherein:

the arm is a first arm extending radially along at least a portion of the leading edge;

the seal cartridge includes a second arm axially-spaced rearwardly from the first arm and extending radially along at least a portion of the trailing edge;

the second arm extends radially from the plate; and the blade is received on the plate and between the first arm and the second arm.

7. The blade assembly of claim 6, wherein the first arm and the second arm each include a respective retention body extending axially away from the blade.

8. The blade assembly of claim 1, wherein the rotatable disk includes a forward surface, and the seal cartridge includes a second arm extending radially inwardly form from the plate along the forward surface.

9. The blade assembly of claim 8, wherein the seal cartridge includes at least one flow passage formed within the second arm, the at least one flow passage defining a respective portion of the second gap.

10. The blade assembly of claim 9, wherein the seal cartridge includes a flow meter provided downstream of the at least one flow passage and extending radially inward from the plate, through the first gap and contacting the rotatable disk.

11. The blade assembly of claim 1, further comprising an axial retainer assembly including a retainer slot and an axial retainer provided within the retainer slot, the axial retainer confronting a respective portion of the seal cartridge to retain the seal cartridge to the rotatable disk.

12. The blade assembly of claim 11, wherein the retainer slot is integrally formed with the rotatable disk.

13. The blade assembly of claim 1, wherein the arm is a first arm extending radially along at least a portion of the leading edge, and the seal cartridge comprises:

the first arm extending along a forward portion of the plate;

a second arm extending radially along at least a portion of the trailing edge and radially outward from an aft portion of the plate, axially opposite the forward portion; and a third arm extending radially inward from the forward portion, with the first arm, the second arm and the third arm formed as a unitary body.

14. The blade assembly of claim 1, wherein:

the slot is included in a plurality of circumferentially spaced slots;

the blade is provided within a plurality of circumferentially spaced blades, with each blade of the plurality of circumferentially spaced blades including a respective root provided within a respective slot of the plurality of circumferentially spaced slots; and the seal cartridge is included within a plurality of circumferentially spaced seal cartridges, with each circumferentially adjacent seal cartridge of the plurality of circumferentially spaced seal cartridges being circumferentially spaced from each other to define a seal gap therebetween.

15. The blade assembly of claim 1, further comprising a spline seal extending circumferentially through and outward from the arm.

16. The blade assembly of claim 15, wherein the spline seal extends circumferentially about an entirety of a circumference of the rotational axis.

17. The blade assembly of claim 1, wherein the first arm includes a protrusion extending from the arm, the protrusion having a radially inner surface that follows a contour of the peripheral surface, the protrusion configured to contact the peripheral surface during operation of the blade assembly.

18. The blade assembly of claim 1, wherein the blade includes a composite material, and the rotatable disk includes a metallic material.

19. The blade assembly of claim 1, wherein the turbine engine comprises a working airflow that flows over a respective portion of the blade, with the second flow of insulating fluid being at least partially defined by the working airflow.

20. The blade assembly of claim 1, wherein the second flow of insulating fluid is configured to heat a respective portion of the blade.

* * * * *